D. D. STEELE.
Weighing Bucket.
No. 45,873.  Patented Jan. 10, 1865.
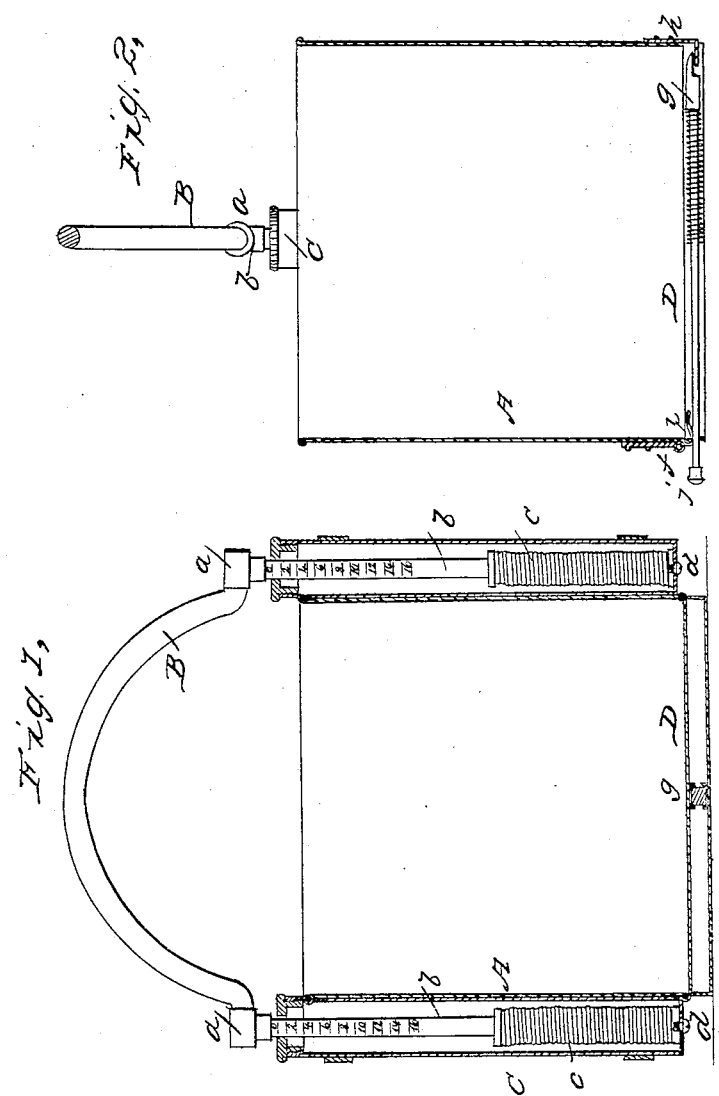

UNITED STATES PATENT OFFICE.

DAVID D. STELLE, OF NEW BRUNSWICK, NEW JERSEY.

IMPROVEMENT IN WEIGHING-BUCKETS.

Specification forming part of Letters Patent No. 45,873, dated January 10, 1865; antedated November 14, 1862.

*To all whom it may concern:*

Be it known that I, DAVID D. STELLE, of New Brunswick, in the county of Middlesex and State of New Jersey, have invented a new and Improved Weighing-Bucket; and I do hereby declare that the following is a full, clear, and exact description of the same, reference being had to the accompanying drawings, forming a part of this specification, in which—

Figure 1 represents a vertical central section of my invention. Fig. 2 is a similar section taken in a plane at right angles to Fig. 1.

Similar letters of reference in both views indicate corresponding parts.

This invention consists in combining with the bucket and its bail one or more weighing devices in such a manner that if the bucket is suspended from the bail and filled with coal, grain, or any other article the weight of the contents of the bucket can be ascertained simply by observing the weighing attachment.

It consists, further, in the arrangement of one or more curved springs and a spring-stop, in combination with the bottom of the bucket, in such a manner that by withdrawing the spring-stop the weight of the contents of the bucket forces the bottom down, and said contents are discharged, and that after the contents of the bucket have been discharged said bottom closes by the force of the spring or springs.

To enable those skilled in the art to make and use my invention, I will proceed to describe it.

The bucket A is made of sheet metal or of wood, or of any other suitable material, and it is provided with a bail, B. This bail may be connected with the bucket, either at or near the top edge of the same, as shown in the drawings, or it may be connected to said bucket by means of swivels at or near the middle of its height. In the first case the bucket is discharged at the bottom, and in the second case it is a dumping bucket, being discharged by turning upside down. The ends of the bail catch in two sockets, $a$, formed at the upper ends of rods $b$, which extend down on the sides of the bucket, and which connect with springs $c$. The springs and rods are surrounded by a case, C, and the lower ends of said springs are firmly attached to the bottoms of these cases by means of screws $d$ or in any other convenient manner.

The rods $b$, together with the springs $c$, form the weighing attachment, and the rods are provided with scales $e$, which are obtained by actual experiment, so that the weight of any article placed in the bucket can be determined by suspending said bucket from its bail. The bail is sprung into the sockets $a$, and a swivel may be secured in its center, so that the same exerts as little friction as possible on the edges of the sockets, and that the weight of the articles in the bucket is equally divided on both ends of the bail. It must be remarked, however, that instead of the rods $b$ and springs $c$ other devices might be arranged for the purpose of producing a weighing attachment, and I do not confine myself, therefore, to the precise arrangement of parts hereinbefore described; but I consider the weighing attachment represented in the drawings as one of the best and simplest devices for my purpose, and fully sufficient to represent my invention and to determine the weight of any article or articles that may be placed in the bucket. If the sockets $a$, which retain the bail, extend up to or beyond the upper edge of the bucket, the contents of the same are discharged by dropping the bottom. Said sockets may, however, be placed lower down at about the middle of the height of the bucket, and the contents can conveniently be discharged by dumping or turning the bucket upside down.

In order to facilitate the discharge through the bottom D, I have connected the same to the body of the bucket by a hinge, $f$, and it is locked by a spring-stop, $g$, which slides in a recess made for this purpose in said bottom, and which catches into a hook, $h$, that is rigidly attached to the lower edge of the bucket, as clearly shown in Fig. 2. Curved springs $i$, which are secured to the bucket next to the hinge $f$, force the bottom up, and the power of these springs is so regulated that the contents of the bucket are able to overcome the same and to force the bottom open as soon as the spring-stop $g$ is withdrawn. By these means the discharging of the bucket is considerably facilitated, and as soon as the same is empty the bottom closes by the action of the springs $i$, and the stop $g$ catches over the hook, so that the bucket can be recharged without delay The spring-stop $g$ is operated by a knob or handle, $j$, under the hinge or in any other convenient manner.

This bucket is of particular advantage for discharging coal or grain from a vessel, and by its aid the weight of said articles can be tallied without trouble and without delaying in the least the ordinary labor of discharging such articles.

Having thus fully described my invention, what I claim as new, and desire to secure by Letters Patent, is—

1. The weighing attachment $b\ c$, or its equivalent, in combination with the bucket A and its bail B, constructed and operating substantially in the manner and for the purpose described.

2. The arrangement of springs $i$ and spring-stop $g$, in combination with the hinged bottom D of the bucket A, as and for the purpose specified.

DAVID D. STELLE.

Witnesses:
  JAMES LAIRD,
  RICHARDSON GAWLEY.